United States Patent
Kobayashi et al.

[11] Patent Number: 5,467,969
[45] Date of Patent: Nov. 21, 1995

[54] ROPE JACK DEVICE FOR A SHUTTLE

[75] Inventors: Osamu Kobayashi, Yotsukaido; Takashi Yoshida, Chiba, both of Japan

[73] Assignee: Otis Elevator Company, Farmington, Conn.

[21] Appl. No.: 113,864

[22] Filed: Aug. 27, 1993

[30] Foreign Application Priority Data

Aug. 27, 1992 [JP] Japan ................. 4-227675

[51] Int. Cl.$^6$ .................. B25B 25/00; B66F 3/00; B60V 3/04
[52] U.S. Cl. ............ 254/251; 254/262; 254/126; 104/23.2
[58] Field of Search .................... 254/234, 253, 254/251, 261, 262, 126, 134.3 PA; 104/23.2, 173.1

[56] References Cited

U.S. PATENT DOCUMENTS

| 2,312,084 | 2/1943 | Dyer, Jr. ............ 254/134.3 PA |
| 4,092,012 | 5/1978 | Ishigami ............... 254/126 |
| 4,550,663 | 11/1985 | DeViaris ........... 104/23.2 X |
| 4,630,543 | 12/1986 | McQueen ........... 104/23.2 X |
| 4,836,502 | 6/1989 | Yamauchi ............. 254/126 |
| 5,176,362 | 1/1993 | Seksaria et al. ......... 254/126 |

Primary Examiner—Daniel P. Stodola
Assistant Examiner—Michael R. Mansen

[57] ABSTRACT

A rope jack for a shuttle system comprises: a rope holder (8) that holds a rope (1) which travels over guide wheels (6) to move a floating shuttle; a catch holder (9) which is attached to be attachable and detachable on a guide rail post (5); and, a jack unit (10) which presses against the rope holder (8) to move the rope holder away from the catch holder (9). The guide wheel (6) is released from the pressure of the rope (1) and can be easily replaced with a new one.

5 Claims, 5 Drawing Sheets

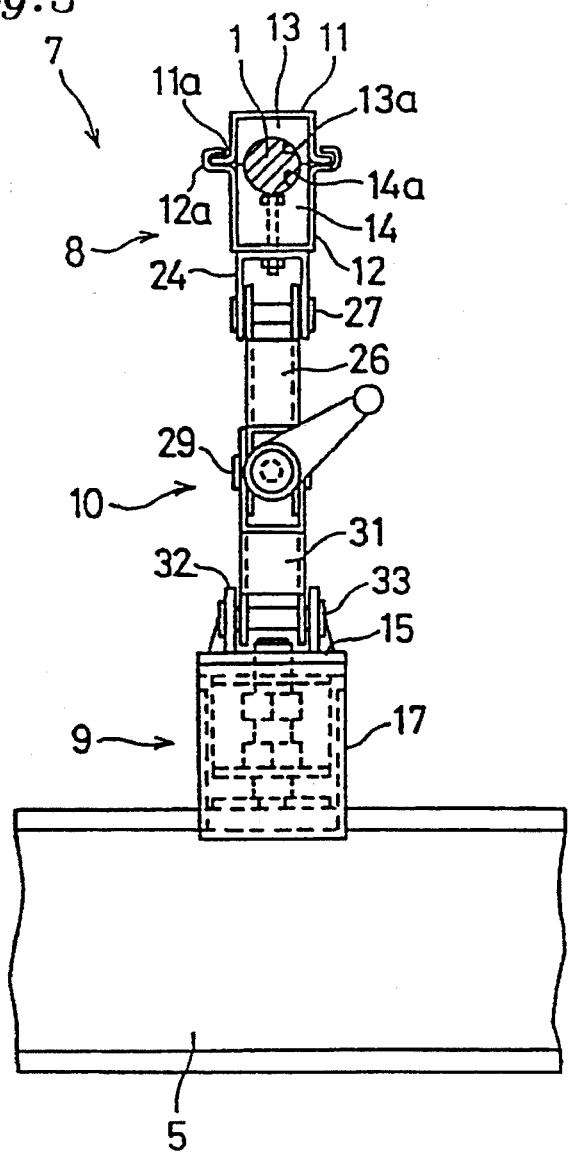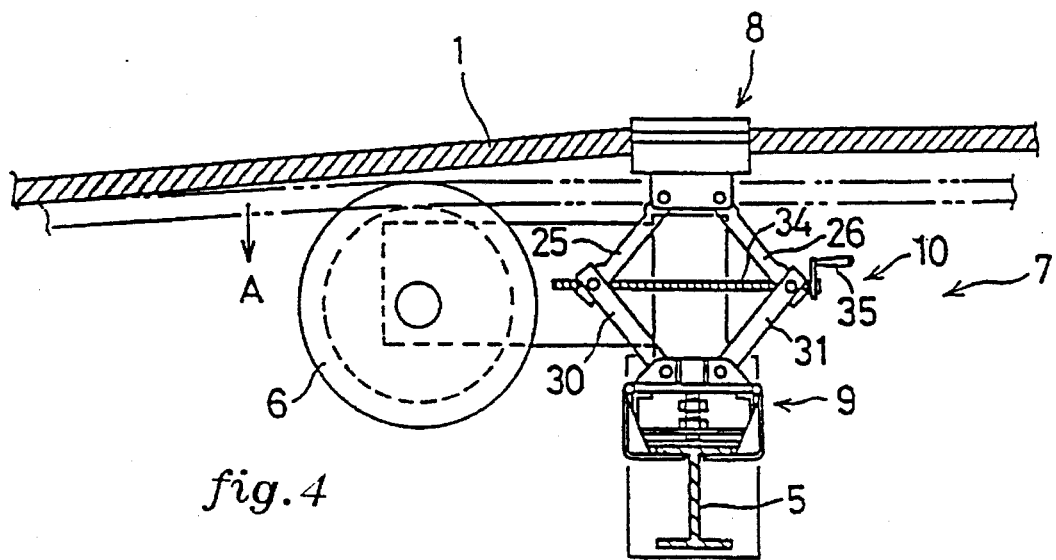

ROPE JACK DEVICE FOR A SHUTTLE

TECHNICAL FIELD invention pertains to a rope jack for a shuttle craft that lifts the rope that pulls the shuttle from a guide wheel.

BACKGROUND ART

In many locations, such as airports, business parks, shopping centers, and resort facilities, there is a demand for short haul transportation systems that are low in noise, low in vibration, and safe. In response to such demands, shuttles (as shown in FIGS. 5 and 6) serve as a horizontal transportation systems that apply the principles of elevators in the horizontal direction.

As shown in FIG. 5, a vehicle (101) is not equipped with wheels to transport it on a track (104); rather, the vehicle (101) is equipped with an air flotation device to lift it away from the surface of the track (104). When the vehicle (101) is lifted by the air pad (102) of the air flotation device, a thin air cushion is formed between the vehicle (101) and the surface of the track (104), allowing the vehicle (101) to move smoothly in the horizontal direction.

A closed-loop pulling rope (103) as shown in FIG. 6 is set on the track surface (104). The rope (103) is attached to the vehicle (101) by a hitch plate (108). A winding device (105), attached to the end of the track surface (104), is used to move the vehicle (101) horizontally by pulling it. The rope (103) is stretched along the track (104) by means of guide wheels (109) which are set on the side of the track (104). As shown in FIG. 7, the guide wheels (109) are supported by guide rail posts (110). In places where there are curves on the track (104), it is necessary to bend the rope (103) according to the curve. For this reason, the guide wheels (109) in such areas are supported in a approximately horizontal attitude on the guide rail posts (110).

DISCLOSURE OF THE INVENTION

The present invention has the objective of providing a rope jack device for a shuttle which separates and holds the rope away from the guide rail post, against any pressing forces in the direction of the guide rail post.

According to the invention, a rope holder which holds a rope that moves the vehicle of a floating shuttle by pulling it; a catch holder, which is attachable and detachable on a guide rail post equipped with guide wheels that guide the rope along the track of the vehicle; and a main jack unit which moves the rope holder away from the catch holder to enable a worker to safely replace a guide wheel.

Over long periods of use, guide wheels (109) are worn down and become less effective. Worn guide wheels (109) must be replaced periodically. Since the guide wheels (109) are constantly pressed in the direction of the guide rail posts (110) by the rope (103) (the direction of the arrow A in FIG. 7), when the guide wheel (109) is removed, the rope (103) may rebound in the direction of the arrow A and could hit the worker. It is therefor necessary to replace the guide wheel (109) while resisting the press force of the rope (103) in the direction of the arrow A. The jack minimizes both the difficulty and danger of replacing the guide roller by securely holding the rope thereby preventing it from rebounding.

The foregoing features and advantages of the present invention will become more apparent in light of the following detailed description of the best mode for carrying out the invention and accompanying drawings.

BRIEF DESCRIPTION OF THE DRAWING:

FIG. 3 is a right-side view of the rope jack of FIG. 2.

FIG. 4 is a plan view which illustrates the operations of the rope jack of FIG. 2;

BEST MODE FOR CARRYING OUT THE INVENTION

Figure 1:
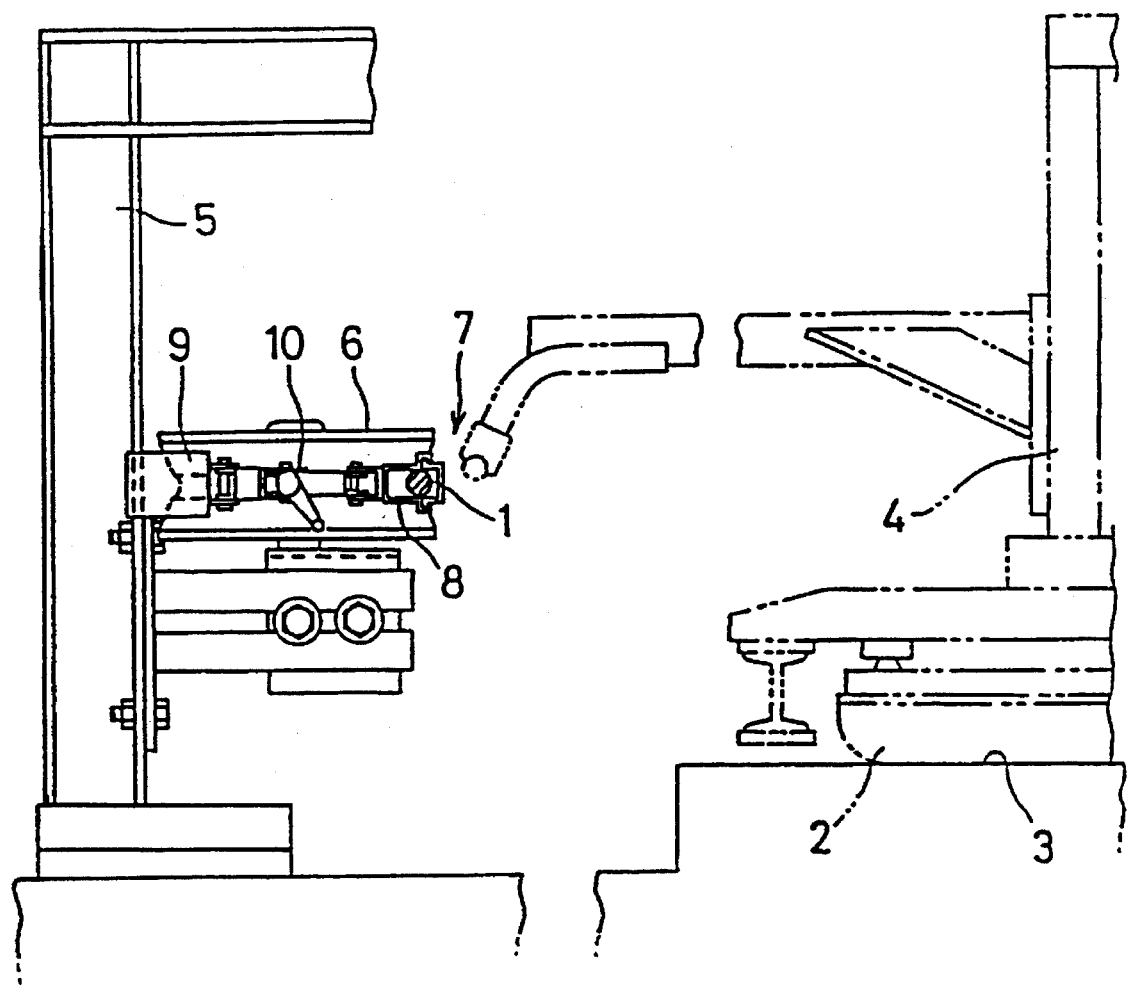
FIG. 1 is a front view of a rope jack device for a shuttle pertaining to the present invention, showing the device attached to the guide rail post.
Figure 6:
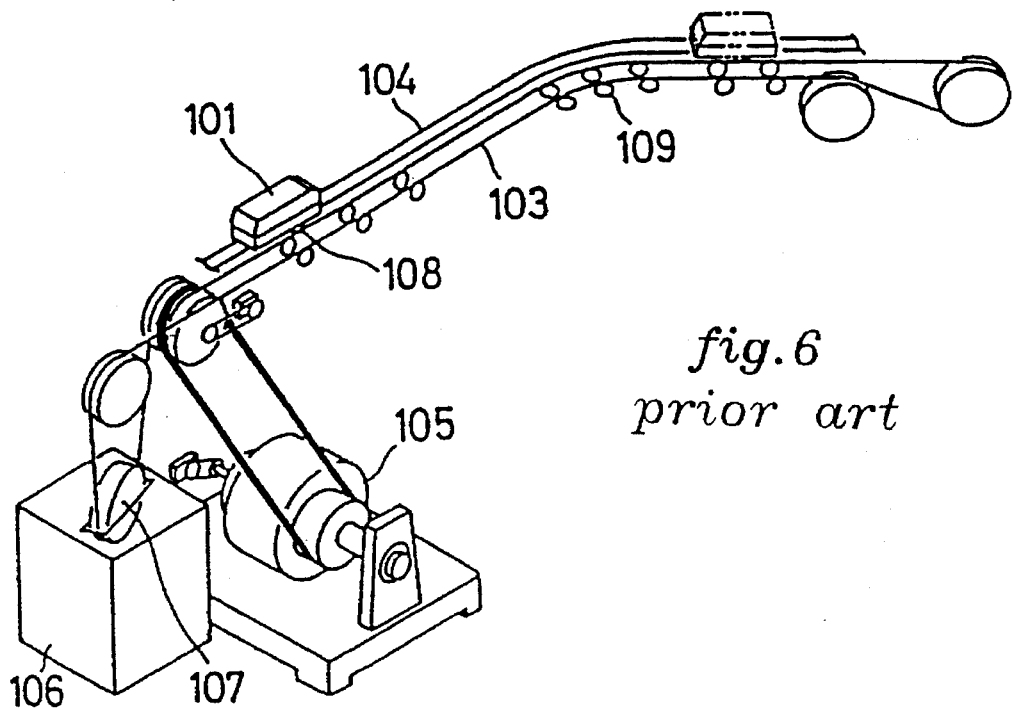
FIG. 6 is an oblique view of the drive mechanism of a prior art shuttle.
Figure 7:
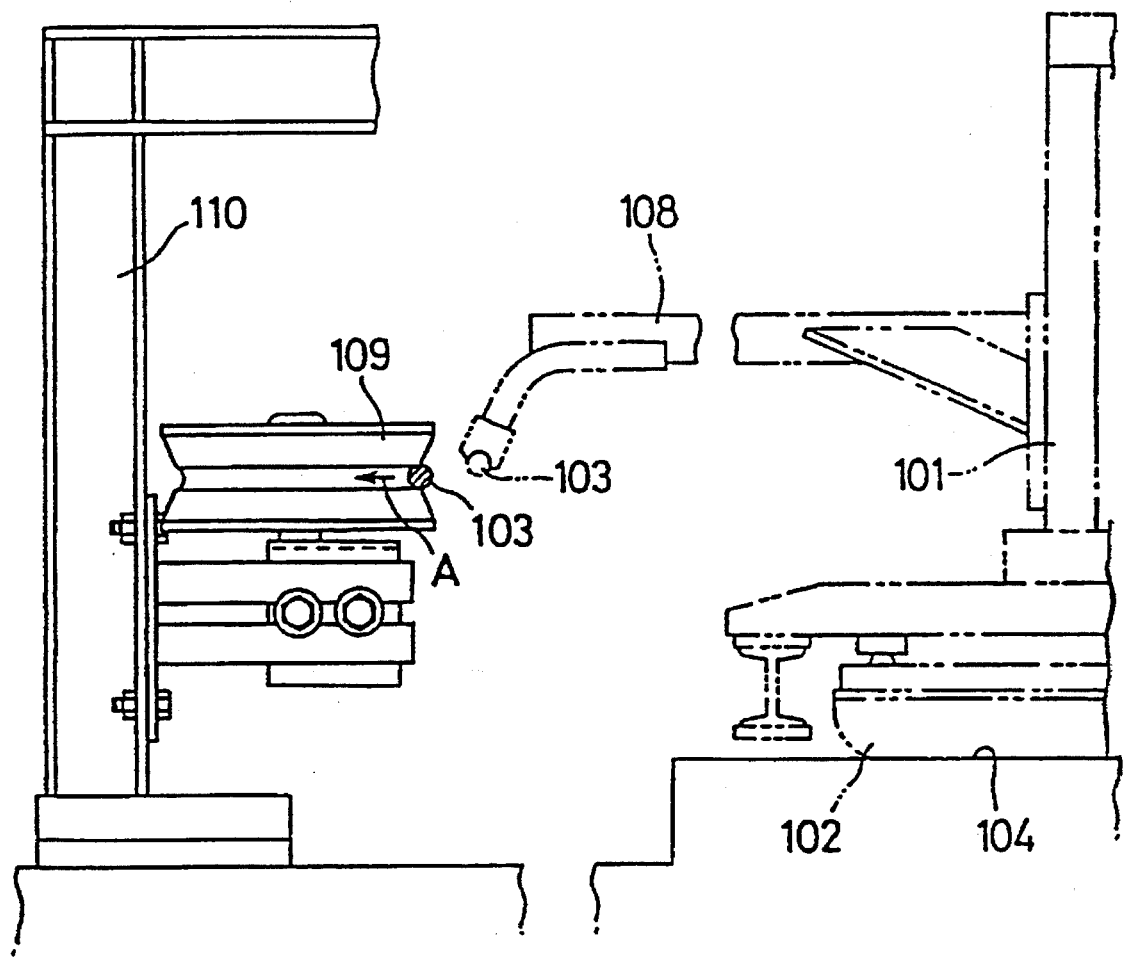
FIG. 7 is a front view of a prior art guide rail post.

Referring to FIG. 1, rope (1) pulls and thereby moves a vehicle (4) of a shuttle floating above a track (3) via an air pad (2). The rope bends in accordance with the curved areas of the track (see FIG. 6). Horizontally disposed guide wheels (6) are attached to guide rail posts (5) as is known in the art in the curved areas. A detachable rope jack (7) is attached on the guide rail post (5) at a height equal to the guide wheel (6).

Figure 2:
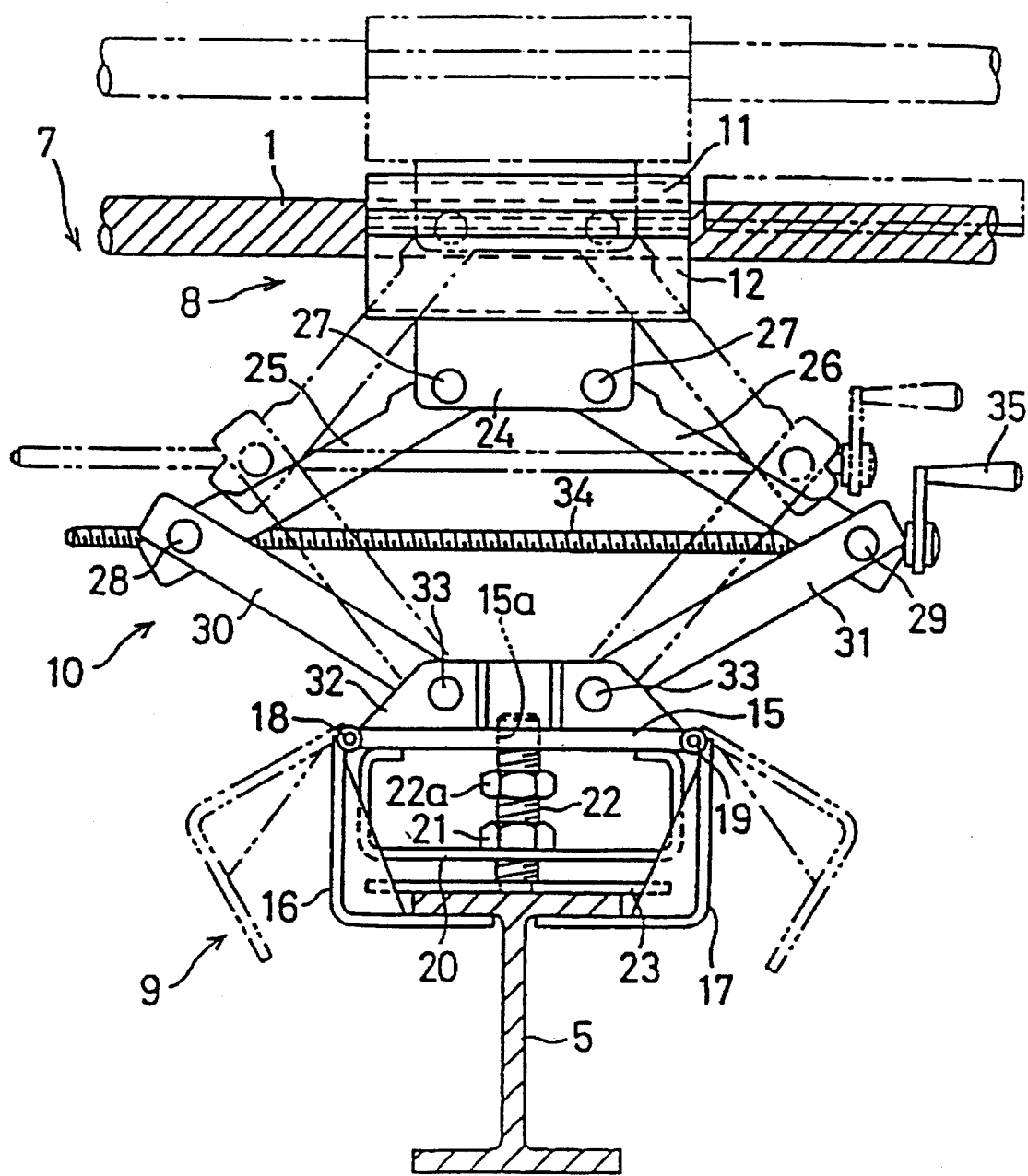
FIG. 2 is a plan view of the rope jack for a shuttle.
Figure 5:
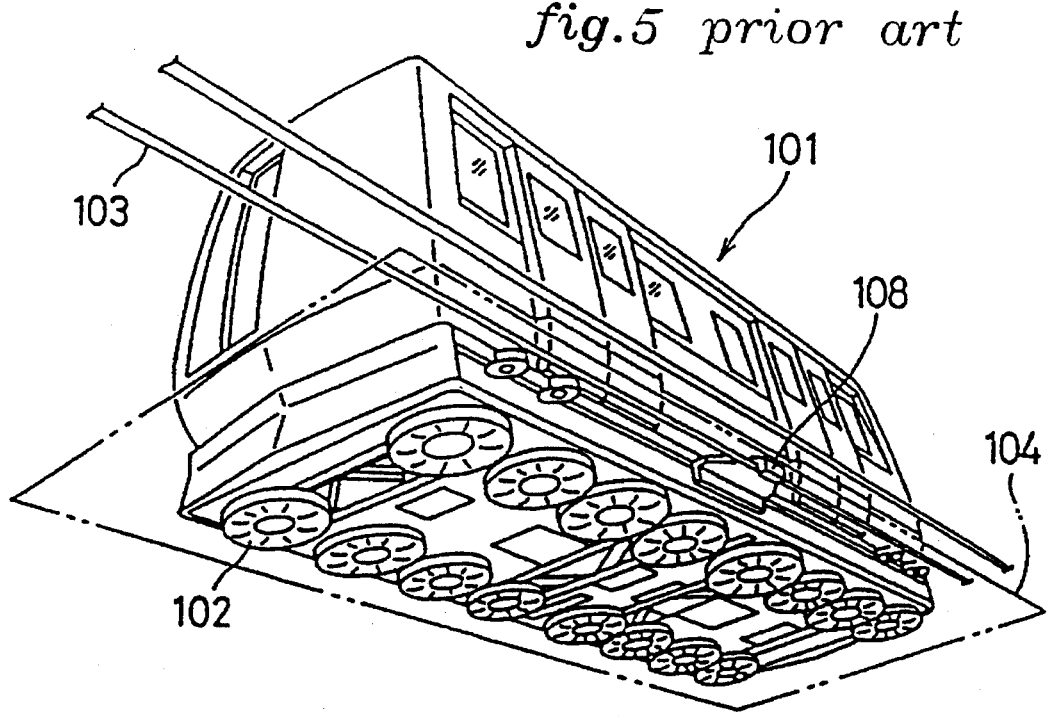
FIG. 5 is an oblique view of a prior art shuttle.

Referring to FIGS. 2 and 3, the rope jack (7) comprises: a rope holder (8); a catch holder (9) which catches the guide rail post (5); and, situated between the catch holder (9) and the rope holder (8), a jack unit (10) which presses the rope holder (8) against the catch holder (9) to separate the rope from the guide rail and hold it.

The rope holder (8) is composed of metal and comprises a pair of coupling members (11) and (12) having hat-shaped cross sections. Polyurethane holding members (13) and (14), on which are formed approximately semicircular grooves (13a) and (14a), are attached inside the coupling members (11) and (12). The coupling members (11) and (12) have coupling pieces (11a) and (12a) which mate with each other. When the holding members (13) and (14) are fitted together, the grooves (13a) and (14a) form an approximately circular shape, inside of which the rope (1) may be positioned.

The catch holder (9), which attaches to an H-shaped steel guide rail post (5), comprises a mount plate (15), which is formed in a rectangular shape. On either end of the mount plate (15), catching members (16) and (17), having approximately L-shaped cross sections, are attached to be freely rotating via hinges (18) and (19). The catching members (16) and (17) are rotated and sized to make contact and couple with the guide rail post (5).

A fixed member (20), having an approximately U-shaped cross section, is welded to the mount plate (15). An insertion hole is formed approximately in the center of the fixed member (20). A fastening nut (21) is welded to the insertion hole. A female screw unit (15a) is formed approximately in the center of the mount plate (15), and a bolt (22) is screwed into the female screw unit (15a) and the fastening nut (21). A nut unit (22a) is formed approximately in the center of the bolt (22).

A press plate (23) is welded to the front end of the bolt (22) to be freely rotating therewith. When the nut unit (22a) is turned, the bolt (22) presses against the guide rail post (5) via the press plate (23).

The jack unit (10) is situated between the catch holder (9) and the rope holder (8). The jack unit (10) comprises a support member (24) having an approximately U-shaped cross section. The support member (24) is fastened to the coupling member (12). A pair of jack arms (25) and (26) are linked to the support member (24) via a support pin (27). The jack arms (25) and (26) are linked via linking pins (28) and (29) to a pair of jack arms (30) and (31). The front ends of the jack arms (30) and (31) are linked via a support pin (33) to a support plate (32) set on the mount plate (15).

A female screw unit is formed on the linking pin (28), and an insertion hole is formed on the linking pin (29). A screw shaft (34) is loosely inserted through the insertion hole of the linking pin and screwed into the female screw unit of the linking pin (28). A jack handle (35) is attached to the end of the screw shaft (34). When the jack handle (35) is turned, the jack arms (25), (26), (30), and (31) are extended or contracted.

To replace a worn guide wheel, the catching members (16) and (17) of the catch holder (9) are rotated to make contact and couple with a location of the same height as the guide wheel (6) on the guide rail post (5). As shown in FIG. 2, the nut unit (22a) is rotated to press the bolt (22) against the guide rail post (5) and fasten the jack to the guide rail post (5).

The rope (1) is then brought into contact with the holding member (14) Of the rope holder (8), and the coupling member (11) is slid sideways into the coupling member (12) to couple with it, thereby fastening the rope (1) to the holding members (13) and (14).

Next, the jack handle (35) is turned as shown in FIG. 4 and the screw shaft (34) allows the jack arms (25), (26), (30), and (31) to extend. Thus, the rope holder (8) stretches the rope (1) so that it extends away from the catch holder (9). As a result, the rope (1) is separated and held away from the guide-wheel (6). In other words, the guide wheel (6) is released from the pressure in direction A in FIG. 4, thus making it possible to replace the worn guide wheel (6) with a new one in this condition.

Next, the reverse operations as the operations described above are performed to remove the rope jack device (7) from the guide rail post (5).

As described above, with the present invention, the main jack unit moves the rope holder away from the catch holder, and the rope away from the guide wheel. Thus, the guide wheel is released from the pressure of the rope and can be easily replaced with a new one. In addition, the rope is reliably separated and held away from the guide rail post, thus minimizing the possibility that the rope will rebound and hit the worker.

Although the invention has been shown and described with respect to a best mode embodiment thereof, it should be understood by those skilled in the art that various other changes, omissions and additions in the form and detail thereof may be made therein without departing from the spirit and scope of the claimed invention. Although a screw was used for the main jack unit, this is not a restriction; it is also possible to use hydraulic pressure or gears, for example.

We claim:

1. A jack for a rope that provides motive force to a vehicle, said rope being guided by a rotatable guide wheel, said guide wheel being supported by a support, said jack comprising:

a rope holder adapted to securely hold said rope;

a holder adapted to be mounted on said support so that said holder does not interfere with said guide wheel and;

a unit interconnecting said rope holder and said holder for moving said rope holder away from said holder to move said rope away from said guide wheel;

whereby when said rope is moved away from said guide wheel, said guide wheel may be freely removed from the support without encountering any interference from said jack.

2. The jack of claim 1 wherein said rope holder comprises:

a first half having a semicircular cross-section, a second half having a semicircular cross-section, said first half and said second half defining a space having a circular cross-section for securely holding said rope, and means for removably holding said first half and said second half together.

3. The jack of claim 2 wherein said means for holding said first half and said second half together comprises:

a pair of flanges depending from said first half, and a pair of slots upon said second half for slideably receiving said flanges.

4. The jack of claim 1 wherein said holder further comprises:

means for removably attaching said holder to said means for supporting said guide wheel.

5. The jack of claim 4 wherein said means for removably attaching comprises:

a hinged flange for engaging a surface of said means for supporting, means for engaging an opposing surface of said means for supporting, and means for clamping said means for engaging against said opposing surface in opposition to said hinged flange to clamp said holder to said means for supporting.

* * * * *